US006982975B1

(12) United States Patent
Aramaki et al.

(10) Patent No.: US 6,982,975 B1
(45) Date of Patent: Jan. 3, 2006

(54) PACKET SWITCH REALIZING TRANSMISSION WITH NO PACKET DELAY

(75) Inventors: Toshiya Aramaki, Tokyo (JP); Kazuhiko Isoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/540,990

(22) Filed: Mar. 31, 2000

(30) Foreign Application Priority Data

Apr. 2, 1999 (JP) .......................................... 11-096996

(51) Int. Cl.
*H04Q 11/04* (2006.01)
*H04L 12/56* (2006.01)

(52) U.S. Cl. ...................... 370/388; 370/394; 370/412; 340/2.21; 379/271

(58) Field of Classification Search ................. 370/230, 370/231, 235, 351, 357, 360, 375, 376, 386, 370/388, 389, 394, 412, 413, 428, 429; 340/2.1, 340/2.2, 2.21, 2.23, 14.1, 14.2; 379/271, 379/272
See application file for complete search history.

(56) References Cited

U.S. PATENT DOCUMENTS

| | | | | |
|---|---|---|---|---|
| 4,022,982 A | * | 5/1977 | Hemdal ....................... 370/388 |
| 4,785,446 A | * | 11/1988 | Dias et al. ................... 370/381 |
| 5,022,025 A | * | 6/1991 | Urushidani et al. .......... 370/422 |
| 5,177,736 A | * | 1/1993 | Tanabe et al. ............... 370/419 |
| 5,237,565 A | * | 8/1993 | Henrion et al. .............. 370/236 |
| 5,317,561 A | | 5/1994 | Fischer et al. |
| 5,390,174 A | | 2/1995 | Jugel |
| 5,453,978 A | * | 9/1995 | Sethu et al. ................. 370/254 |
| 5,636,210 A | * | 6/1997 | Agrawal ...................... 370/390 |
| 5,781,546 A | * | 7/1998 | Sethu ......................... 370/389 |
| 6,151,325 A | * | 11/2000 | Hluchyj ...................... 370/398 |

FOREIGN PATENT DOCUMENTS

| | | |
|---|---|---|
| JP | 03-139043 | 6/1991 |
| JP | 05-83283 | 4/1993 |
| JP | 06-6370 | 1/1994 |
| JP | 07-30546 | 1/1995 |
| WO | WO 99/07180 A2 | 2/1999 |

OTHER PUBLICATIONS

"A Study of Control Algorithm for Large Scale ATM Switch", *Institute of Electronics, Information and Communication Engineers of Japan*, Technical Study Report SSE89–173, vol. 89, No. 451, Mar. 14, 1990, pp. 61–66.

* cited by examiner

*Primary Examiner*—Alpus H. Hsu
(74) *Attorney, Agent, or Firm*—Sughrue Mion, PLLC

(57) ABSTRACT

In a packet switch structured by connecting unit switches in multi-stages which is capable of transmitting packets without delay and accommodating high-speed lines, unit switches at the first stage assign, to an input packet, a sequence number according to a destination of the packet and distribute and send out the packet to a unit switch at the succeeding stage and unit switches at the final stage sequence and output packets according to sequence numbers assigned to packets received from a unit switch at the preceding stage.

15 Claims, 11 Drawing Sheets

PACKET SWITCH REALIZING TRANSMISSION WITH NO PACKET DELAY

BACKGROUND OF THE INVENTION

1. Field of the Invention

The present invention relates to a packet switch for use in a packet switching system communication network and, more particularly, to a large-scale packet switch having unit switches connected in multi-stages.

2. Description of the Related Art

In a high-speed packet switching system communication network, a large-scale packet switch handling more than several hundreds of lines is realized by connecting a medium- or small-scale packet switches in multi-stages. As an example of a packet switch having such a multi-stage connection structure, a three-stage connection packet switch is shown in FIG. 13.

The packet switch illustrated in FIG. 13 is composed of connected unit switches 1311 and 1312 at the first stage, unit switches 1321 and 1322 at the second stage and unit switches 1331 and 1332 at the third stage. Here, as communication paths, there exist a plurality of paths made by a combination between arbitrary input port and output port.

For accommodating connection-oriented traffic as in ATM (Asynchronous Transfer Mode), selection of a path to be used is made at the setting of a call. On this occasion, for preventing internal blocking (a state where although a free band exists at a final output port, path setting is impossible within the unit switches 1321 and 1322 at the second stage), it is necessary to set paths so as not to cause a deviation in load.

For accommodating connectionless IP traffic, a packet belonging to the same flow should pass through the same path. There therefore arises the need of path selection every time flow starts similarly to the case of connection-oriented traffic.

Then, for either traffic, path selection involving no internal blocking needs centralized control by the entire switch, which results in sacrificing extensibility.

On the other hand, there is a method of preventing internal blocking by, at the outputting of packets from unit switches at the first stage to unit switches at the second stage, evenly distributing the packets to the unit switches at the second stage to macroscopically uniform a load of a unit switch at each second stage. At a multi-stage connection packet switch shown in FIG. 14, switching is conducted according to a destination of a packet at unit switches 1421 and 1422 at the second stage and at a unit switch 1431 at the final stage after returning.

According to such a switching method, however, there occurs a case where packets belonging to the same flow/connection pass through different paths. In a microscopic view, load of each path might vary. As a result, the order of packets at the final stage might be different from that of packets applied to an input port, that is, the original order. For preventing such a situation, a time stamp indicating an input order is assigned at the input port to sequence packets at the unit switch 1431 at the final stage based on the time stamps.

Since this control is local control conducted at the unit switch 1431 at the final stage, distributed control is possible at the unit switch 1431 at each final stage. This is therefore effective when a structure of a packet switch is extended as required.

As a conventional packet switch of this kind using a time stamp, there is, for example, a packet switch disclosed in the literature "A Study of Control Algorithm for Large Scale ATM Switch" (Institute of Electronics, Information and Communication Engineers of Japan, Technical Study Report SSE89-173). According to the art recited in the literature, at the three-stage connection packet switch shown in FIG. 13, a time stamp indicative of a time of packet input is assigned to an input packet at the input ports of the unit switches 1311 and 1312 at the first stage.

Packets assigned time stamps are distributed to the unit switches 1321 and 1322 at the second stage irrespective of their destinations. At the unit switches 1321 and 1322 at the second stage and the unit switches 1331 and 1332 at the third stage, the packets are sent to output ports corresponding to their destinations.

At the output ports of the unit switches 1331 and 1332 at the third stage, the packets are temporarily held for delay. Then, the packets are sequentially output to the output ports, starting with a packet which has passed a time period longer than a predetermined time after the application to the unit switches 1311 and 1312 at the first stage (a maximum delay time required for passing from the unit switches 1311 and 1312 at the first stage to the unit switches 1331 and 1332 at the third stage). The foregoing processing enables packet sequencing.

Another conventional packet switch using a time stamp is, for example, a packet switch recited in Japanese Patent Laying-Open (Kokai) No. heisei 6-6370. According to the technique disclosed in the literature, a unit switch at each first stage first distributes output cells to unit switches at the second stage according to output conditions of cells. Then, a unit switch at the third stage selects, in one clock cycle and for each output line, a cell whose immediately preceding cell is already output from each logic buffer provided corresponding to each unit switch at the first stage one by one, subsequently reads a cell whose time stamp is the oldest from among the selected cells and sends the read cell onto the output line. By the foregoing processing, packets are sequenced.

Conventional packet switches using a time stamp, however, output packets with a delay of a predetermined time in order to sequence packets arriving at unit switches at the final stage as described above. As a result, the switches have a shortcoming that a time required for packet transmission can not be made shorter than a maximum delay time required for a packet to pass from a unit switch at the first stage to a unit switch at the third stage.

In addition, for sequentially outputting a cell whose time stamp is the oldest, it is necessary to compare time stamps of all the cells which can be output to identify a cell having the oldest time stamp, which requires complicated processing.

SUMMARY OF THE INVENTION

An object of the present invention is to solve the above-described conventional shortcomings and provide a packet switch capable of transmitting a packet without a delay by simple processing based on a sequence number assigned to an input packet.

According to one aspect of the invention, a packet switch formed by connecting unit switches in multi-stages, wherein a unit switch at the first stage assigns a sequence number to an input packet according to a destination of the packet and distributes and sends out the packet to a unit switch at a succeeding stage, and a unit switch at the final stage sequences and outputs a packet received from a unit switch at a preceding stage according to a sequence number assigned to the packet.

In the preferred construction, the unit switch at the first stage assigns, to an input packet, a sequence number set for each combination of a unit switch which has received input of the packet and a unit switch which finally outputs the packet, as well as assigning identification information about its own switch which is a unit switch having received input of the packet.

In another preferred construction, the total number of sequence numbers to be assigned by the unit switch at the first stage to an input packet is set based on a maximum value of a queuing delay at a unit switch at the succeeding stage and the number of input and output ports of the unit switch in question at the succeeding stage.

In another preferred construction, the unit switch at the first stage assigns, to an input packet, a sequence number set for each combination of a unit switch which has received input of the packet and a unit switch which finally outputs the packet, as well as assigning identification information about its own switch which is a unit switch having received input of the packet, and the unit switch at the final stage includes queues provided for the respective unit switches at the first stage which receive input of packets and slotted on a packet basis, based on the identification information and the sequence number assigned to a packet arriving from a unit switch at the preceding stage, writes the packet in question into a corresponding slot of corresponding one of the queues, and sequentially reads and outputs the packets written in the queues according to the order of the sequence numbers.

In another preferred construction, the unit switch at the final stage determines an initial value of a read pointer for the queue based on a sequence number of a packet received first.

In another preferred construction, when a packet is read from a slot indicated by a read pointer in the queue or when no packet arrives at the slot indicated by the read pointer in the queue for a predetermined time period, the unit switch at the final stage updates the read pointer in question.

In another preferred construction, the unit switch at the final stage determines an initial value of a read pointer for the queue based on a sequence number of a packet received first, and when a packet is read from a slot indicated by a read pointer in the queue or when no packet arrives at the slot indicated by the read pointer in the queue for a predetermined time period, updates the read pointer in question.

In another preferred construction, the unit switch comprises a 2N×2 switch unit having a number 2N of input ports and a number N of output ports, a packet distribution unit for assigning, to an input packet, a sequence number according to a destination of the packet and distributing and sending out the packet to a unit switch at a succeeding stage, a packet alignment unit for sequencing, according to a sequence number assigned to a packet received from a unit switch at a preceding stage, a packet and transferring the sequenced packets to the 2N×N switch unit, and a filter for distributing input packets into packets to be returned within its own switch and packets to be sent out to a unit switch at a succeeding stage and transferring the packets to be returned to the 2N×N switch unit and transferring the packets to be sent to a switch at a succeeding stage to the packet distribution unit.

In another preferred construction, the packet distribution unit at the unit switch at the first stage assigns, to an input packet, a sequence number set for each combination of a unit switch which has received input of the packet and a unit switch which finally outputs the packet, as well as assigning identification information about its own switch which is a unit switch having received input of the packet.

In another preferred construction, the total number of sequence numbers to be assigned by the packet distribution unit in the unit switch at the first stage to an input packet is set based on a maximum value of a queuing delay at a unit switch at the succeeding stage and the number of input and output ports of the unit switch in question at the succeeding stage.

In another preferred construction, the unit switch at the final stage includes queues provided for the respective unit switches at the first stage which receive input of packets and slotted on a packet basis, based on the identification information and the sequence number assigned to a packet arriving from a unit switch at a preceding stage, the packet alignment unit writes the packet in question into a corresponding slot of corresponding one of the queues, and the 2N×N switch unit sequentially reads and outputs the packets written in the queues according to the order of the sequence numbers.

In another preferred construction, the unit switch at the final stage determines an initial value of a read pointer for the queue based on a sequence number of a packet received first.

In another preferred construction, when a packet is read from a slot indicated by a read pointer in the queue or when no packet arrives at the slot indicated by the read pointer in the queue for a predetermined time period, the unit switch at the final stage updates the read pointer in question.

In another preferred construction, the unit switch at the final stage determines an initial value of a read pointer for the queue based on a sequence number of a packet received first, and when a packet is read from a slot indicated by a read pointer in the queue or when no packet arrives at the slot indicated by the read pointer in the queue for a predetermined time period, updates the read pointer in question.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
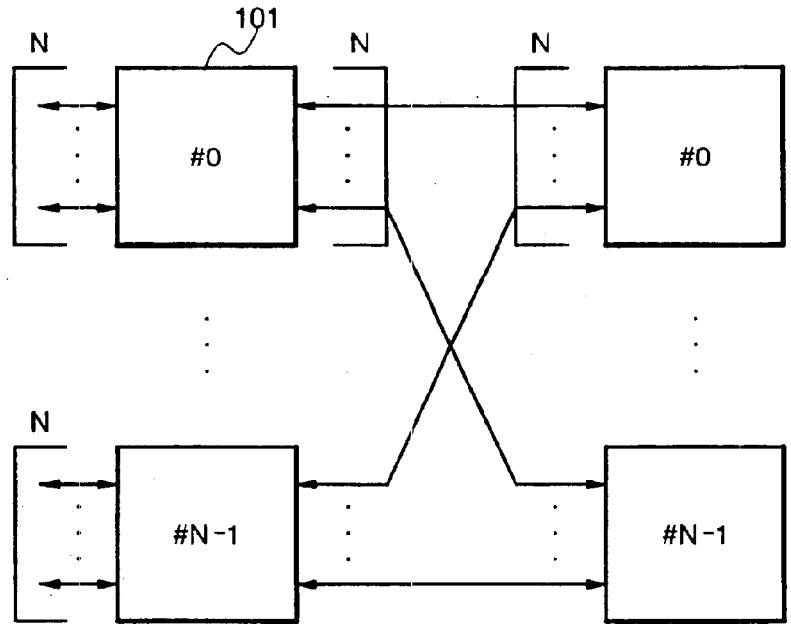
FIG. 1 is a block diagram showing a structure of a packet switch according to one embodiment of the present invention.

FIG. 1 is a block diagram showing a structure of a packet switch according to one embodiment of the present invention. With reference to FIG. 1, the packet switch of the present embodiment is constituted by two-stage connection of a number N of unit switches 101 each equivalent to 2N×2N. A switch having such a connection form as illustrated in the figure is referred to as a folded-type multi-stage switch.

In the present embodiment, description will be made of a case where the present invention is applied to such a folded-type multi-stage switch as illustrated in the figure.

In a folded-type multi-stage switch, connecting unit switches each equivalent to 2N×2N in two stages forms a packet switch equivalent to $N^2 \times N^2$. Also, connecting the same in three stages forms a packet switch equivalent to $N^3 \times N^3$. The number of unit switches required for a packet switch of such a structure is 2N when the packet switch equivalent to $N^2 \times N^2$ is structured and $3N^2$ when the packet switch equivalent to $N^3 \times N^3$ is formed.

On the other hand, in a case where a packet switch is formed by square lattice expansion, the number of unit switches required for a packet switch equivalent to $N^2 \times N^2$ is $N^2$, while the number of unit switches required for a packet switch equivalent to $N^3 \times N^3$ is $N^4$. A folded-type multi-stage switch is accordingly allowed to reduce the number of necessary unit switches to be smaller than that required for a packet switch formed by square lattice expansion.

In the folded-type multi-stage switch of the present embodiment, a series of sequence numbers (SN) is assigned, at each input port, to packets belonging to the same combination of an input side unit switch and an output side unit switch. Then, at a unit switch at the final stage, the packets are sequenced according to the SN numbers. The sequenced packets are sent to output ports corresponding to their destinations.

In the following, the present embodiment will be described assuming that a packet has a fixed length. When a packet of a variable length is handled, it is only necessary to add, to an input part of a packet at a unit switch at the first stage, a structure for fragmenting a packet of a variable length into packets of a fixed length and add, to an output part of the packet at a unit switch at the final stage, a structure for bringing packets of a fixed length together into a packet of a variable length. It should be clearly understood that adding these structures for fragmenting a packet of a variable length into packets of a fixed length and bringing packets of a fixed length together into a packet of a variable length is not a technical characteristic of the present embodiment.

Figure 2:
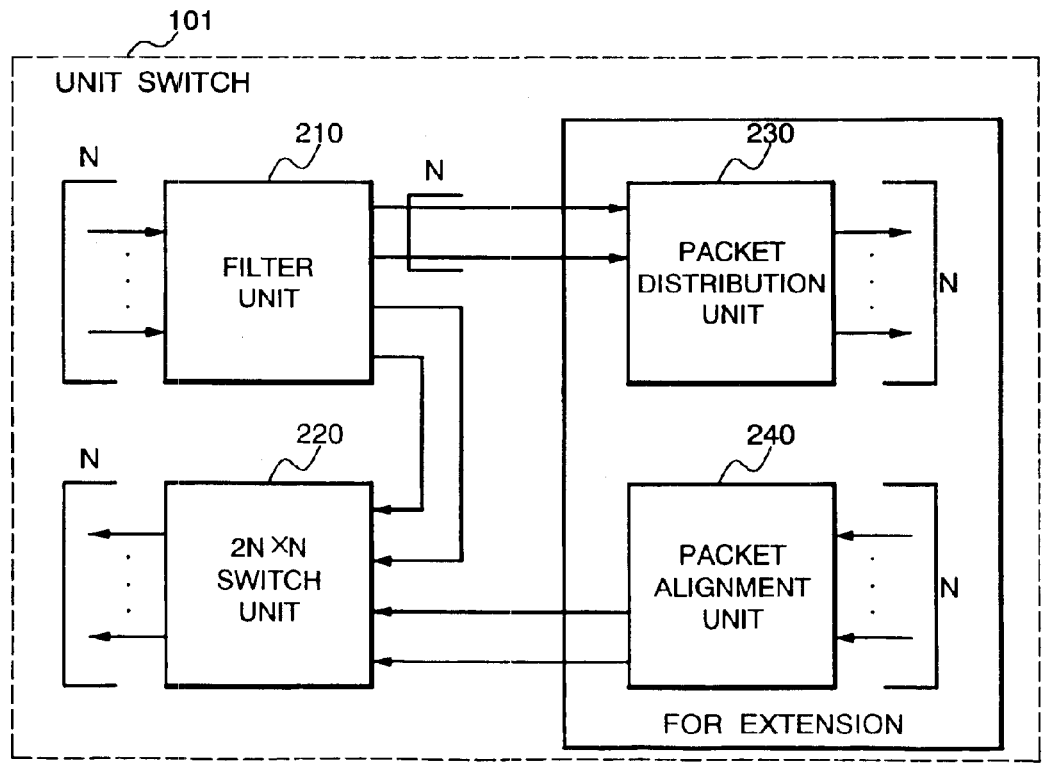
FIG. 2 is a block diagram showing a structure of a unit switch constituting the packet switch illustrated in FIG. 1.

Structure of the unit switch 101 equivalent to 2N×2N according to the present embodiment is shown in FIG. 2. With reference to FIG. 2, the unit switch includes a filter unit 210, a 2N×N switch unit 220, a packet distribution unit 230 and a packet alignment unit 240. Of these units, the packet distribution unit 230 and the packet alignment unit 240 are circuits for extension, that is, for connecting unit switches in multi-stages.

In the above described structure, the filter unit 210 allots an input packet according to its destination. More specifically, when an input packet is to be returned in its own switch, the unit 210 transfers the input packet in question to the 2N×N switch unit 220 and when the packet is to be sent to other unit switch, transfers the same to the packet distribution unit 230.

The 2N×N switch unit 220 has a number 2N of input ports and a number N of output ports. The switch unit 220 has input ports double the number of output ports because when a multi-stage connection is made, it is necessary to process both a packet which is to return in its own switch and a packet received form other unit switch. When the unit switch operates singly, the switch unit 220 operates as an N×N switch because no packet is applied from other unit switch.

Figure 3:
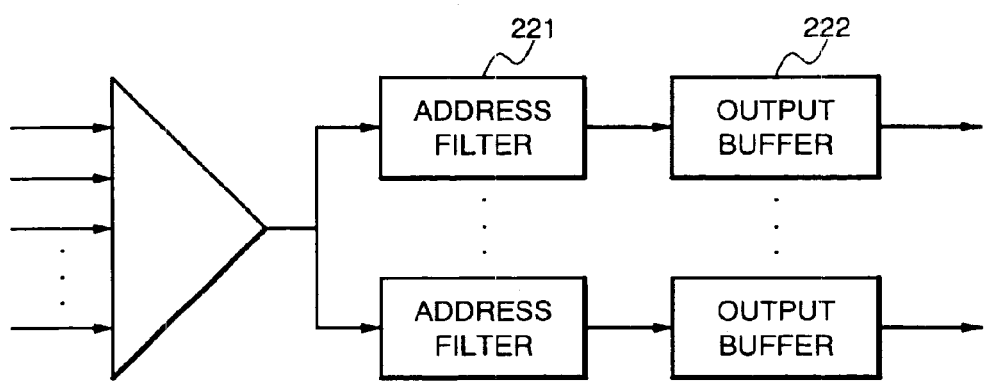
FIG. 3 is a block diagram showing a structure of a 2N×N switch unit in the present embodiment.

Structure of the 2N×N switch unit 220 is shown in FIG. 3.

With reference to FIG. 3, the 2N×N switch unit 220 is an output buffer switch. In the illustrated structure, a packet applied to the 2N×N switch unit 220 is subjected to time-division multiplexing and then sent to each output port. Then, at each output port, address filtering is conducted with respect to each packet. More specifically, an address filter 221 at each output port passes only a packet bound for its own output port according to an address of a destination of the packet and stores the packet in an output buffer 222. The packet stored in the output buffer 222 is taken out in line with a speed of the output port and is output to the output port.

Next, description will be made of the packet distribution unit 230 and the packet alignment unit 240. As described above, the packet distribution unit 230 and the packet alignment unit 240 are components used when a packet switch is a multi-stage switch structured by a multi-stage connection of the unit switches 101. Description of the packet distribution unit 230 will be made assuming that its own switch is a unit switch at the first stage and other unit switches exist at the succeeding stages, while description of the packet alignment unit 240 will be made assuming that its own switch is a unit switch at the final stage and other unit switches exist at the preceding stages.

The packet distribution unit 230 suitably distribute and output a packet received from the filter unit 210 to a unit switch at a stage succeeding to its own switch. On this occasion, a series of sequence numbers (SN) is assigned to packets having the same combination of a unit switch which receives input of the packet (unit switch at the first stage) and a unit switch which outputs the packet (unit switch at the final stage). In practice, since the unit switch at the first stage is its own switch, packets with the same series of sequence numbers (SN) will arrive at each unit switch at the final stage.

In addition, assigned to all the packets is identification information indicating through which unit switch 101 at the first stage a packet in question is applied (e.g. a number of a unit switch of its own). These arrangement enables referring, at a unit switch at the final stage, to a sequence number (SN) and identification information about a unit switch at the first stage assigned to an arriving packet to lead to alignment of packets for each unit switch at the first stage which has received input of the packet in question and according to the order of application to the unit switch in question at the first stage.

Figure 4:
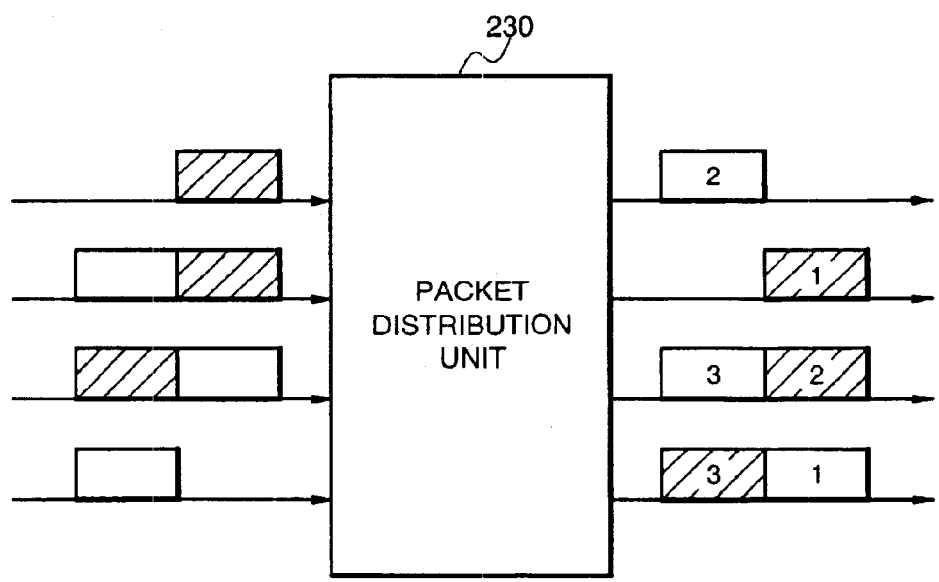
FIG. 4 is a diagram for use in explaining operation of a packet distribution unit in the present embodiment.

As a packet distribution method, there is such a system of shifting a connection relation between an input and an output one by one irrespectively of a destination of a packet as barrel shifter, for example. An example of distribution and output in this case is shown in FIG. 4. with reference to FIG. 4, packets applied to the packet distribution unit 230, those bound for a unit switch #1 (packets with slanting lines) and those bound for a unit switch #N (packets with no slanting lines), are separately assigned sequence numbers (SN) 1–3 and are output with a connection relationship between an input and an output shifted one by one.

Although the above-described distribution method is considered to achieve sufficient performance, the performance can be further improved by distributing packets using a sequence number (SN) sent from a unit switch at a succeeding stage to a unit switch at a preceding switch and feedback information regarding the amount of queuing. It is, for example, possible to adopt a method of preferentially sending a packet to a unit switch whose queuing amount is smaller.

The packet alignment unit 240 aligns packets received from a unit switch at the preceding stage and transfers the aligned packets to the 2N×N switch unit 220. Structure of the packet alignment unit 240 is shown in FIG. 5.

Figure 5:
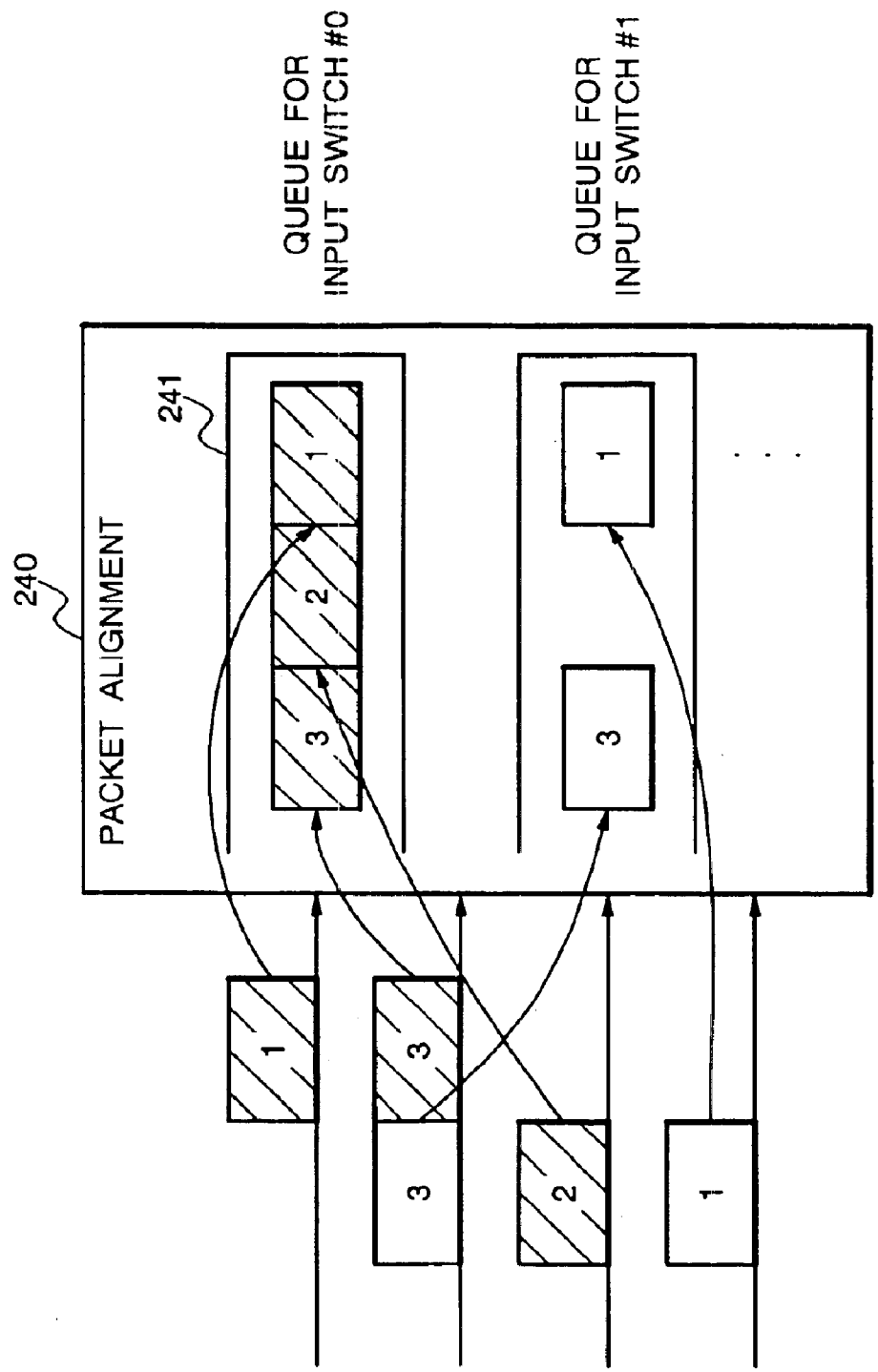
FIG. 5 is a diagram for use in explaining packet accumulation operation by a packet alignment unit in the present embodiment.

With reference to FIG. 5, the packet alignment unit 240 has a queue 241 provided corresponding to each unit switch at the first stage. The queue 241 is slotted on a packet basis. When a packet arrives, the packet alignment unit 240 identifies a unit switch at the first stage to which the packet in question is applied based on identification information assigned to the packet in question and writes the packet in the corresponding queue. On this occasion, writing into the queue is executed using a sequence number (SN) assigned to the packet in question as a write pointer.

Shown in FIG. 5 is a state where packets arriving in no special order are separately, as packets applied to the unit switch #0 (packets with slanting lines) and packets applied to the unit switch #1 (packets with no slanting lines), written into the queue 241 in the order of sequence numbers (SN).

Figure 6:
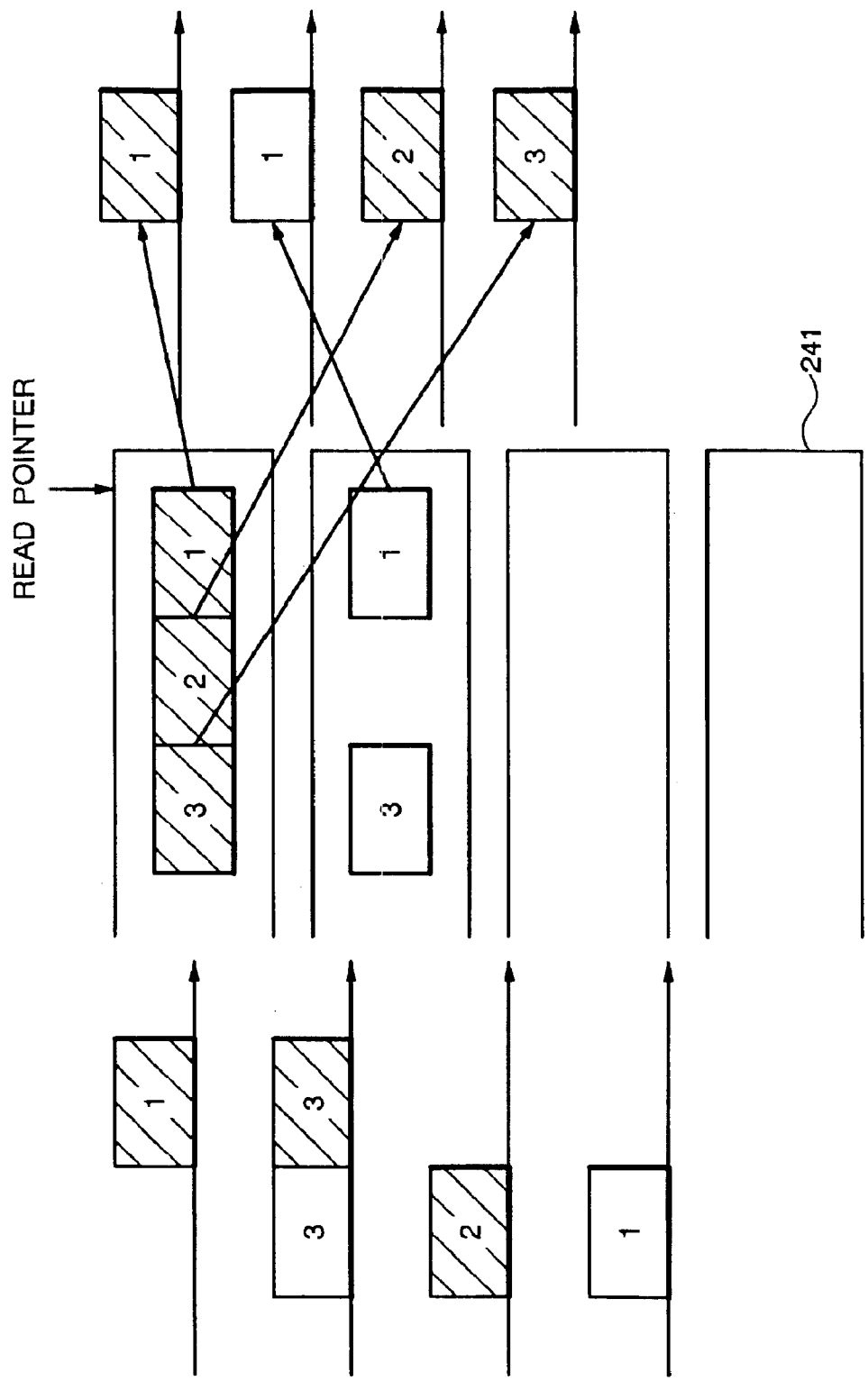
FIG. 6 is a diagram for use in explaining operation of outputting a packet from the packet alignment unit.

Accordingly, sequentially reading the packets written in the queue 241 from the top as illustrated in FIG. 6 will result in sequencing the packets.

As described in the foregoing, according to the present embodiment, since processing conducted at a unit switch at the final stage for detecting a position of a queue corresponding to a sequence number (SN) assigned to an arriving packet, in other words, determining whether the sequence number (SN) assigned to the packet and a write pointer at a position of the queue in which no packet is yet to be written coincide with each other completes packet alignment work, packet alignment can be conducted with much simpler processing than that for the alignment conducted by comparing time stamps of the respective packets to identify a packet having the oldest time stamp as has been described in the Related Art.

A read pointer for reading a packet from the queue 241 is sequentially updated for each slot. Updating timing is assumed to be at packet reading or when no packet arrives for a time period longer than a predetermined time.

There, however, occurs a case where a packet assigned a sequence number (SN) at a unit switch at the first stage is abandoned before reaching a unit switch at the final stage due to buffer overflow of a unit switch on the way.

In this case, waiting for the packet in question to arrive will result in making a determination, when a following packet having the same sequence number (SN) as that assigned to the abandoned packet in question arrives after one circulation of the sequence numbers (SN), that the abandoned packets in question has arrived to conduct erroneous alignment of packets.

Figure 7:
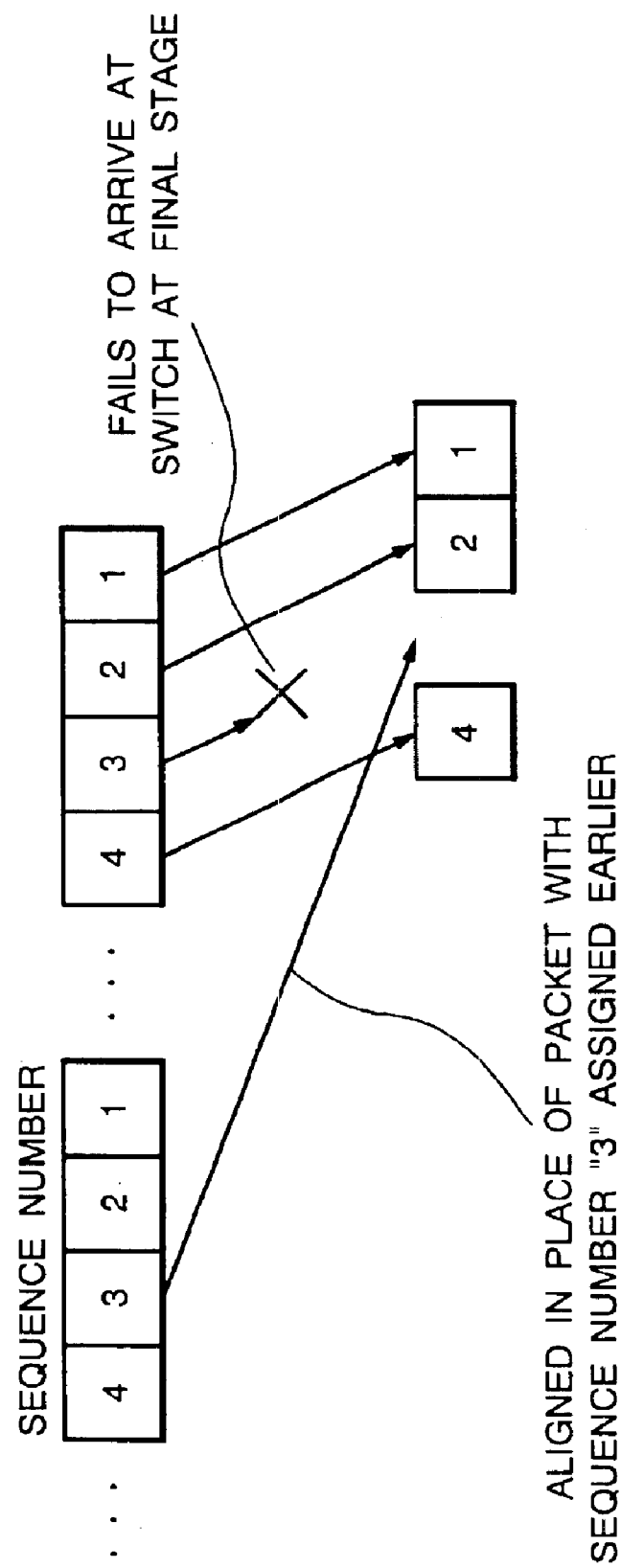
FIG. 7 is a diagram showing how a packet is abandoned due to a buffer overflow of a unit switch while the packet passes through a packet switch.

With reference to FIG. 7, shown is a state where with two packets assigned the sequence number "3", the packet first assigned the sequence number "3" is abandoned, whereby the packet later assigned the sequence number "3" is aligned together with a group of packets applied earlier in place of the abandoned packet.

For preventing such a situation, it is necessary to conduct processing of calculating an initial value of a read pointer based on a sequence number (SN) of a first received packet, as well as updating the read pointer under appropriate conditions. A method of determining an initial value of a read pointer and a method of updating the read pointer are shown in the flow charts of FIGS. 8 and 9.

Figure 8:
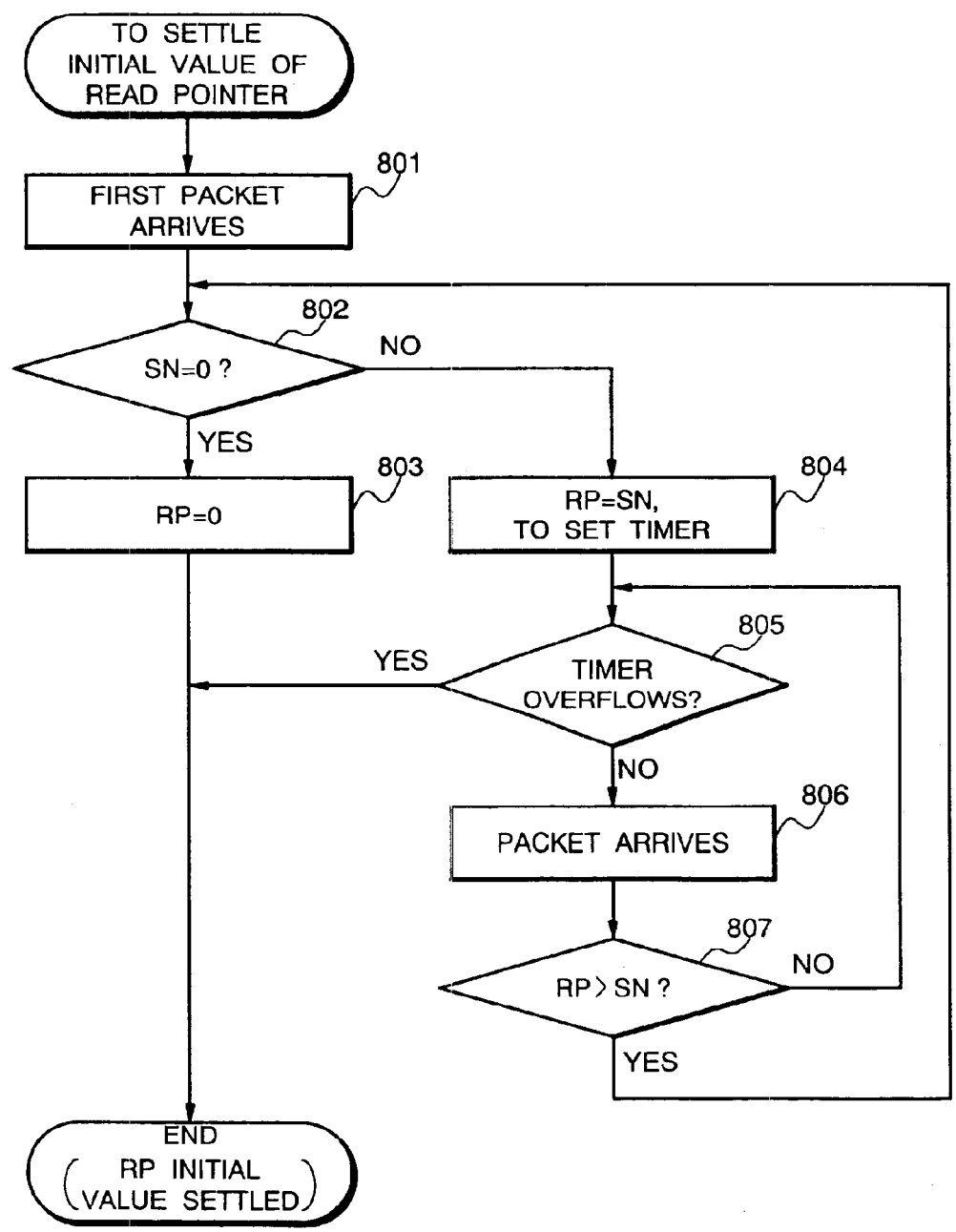
FIG. 8 is a flow chart showing operation of determining an initial value of a read pointer for use in reading a packet from a queue by the packet alignment unit in the present embodiment.

With reference to FIG. 8, operation of determining an initial value of a read pointer will be described. First, when a first packet arrives, determine whether a sequence number (SN) of the packet in question is an initial value (the number first assigned to a packet: assuming here that the initial value is "0") (Steps 801 and 802). When the sequence number (SN) is "0", that is, the initial value, set the value of the read pointer of a slot to "0" (Step 803) to finish processing (initial value of the read pointer is settled).

On the other hand, when the sequence number (SN) of the packet arriving first is not "0", set the value of the read pointer to the sequence number (SN) in question and set a timer (Step 804). Then, when none of new packets arrives before the timer in question overflows, finish processing with the value of the read pointer set at the Step 804 as an initial value (Step 805).

When a new packet arrives before the timer overflows (Steps 805 and 806), compare the sequence number (SN) of the packet in question and the value of the read pointer set at Step 804 (Step 807). Then, when the sequence number (SN) in question is smaller than the read pointer, return to Step 801 to set a value of the read pointer over again. When the sequence number (SN) in question is not less than the value of the read pointer, return to Step 805 to wait for a new packet to arrive until the timer overflows.

Figure 9:
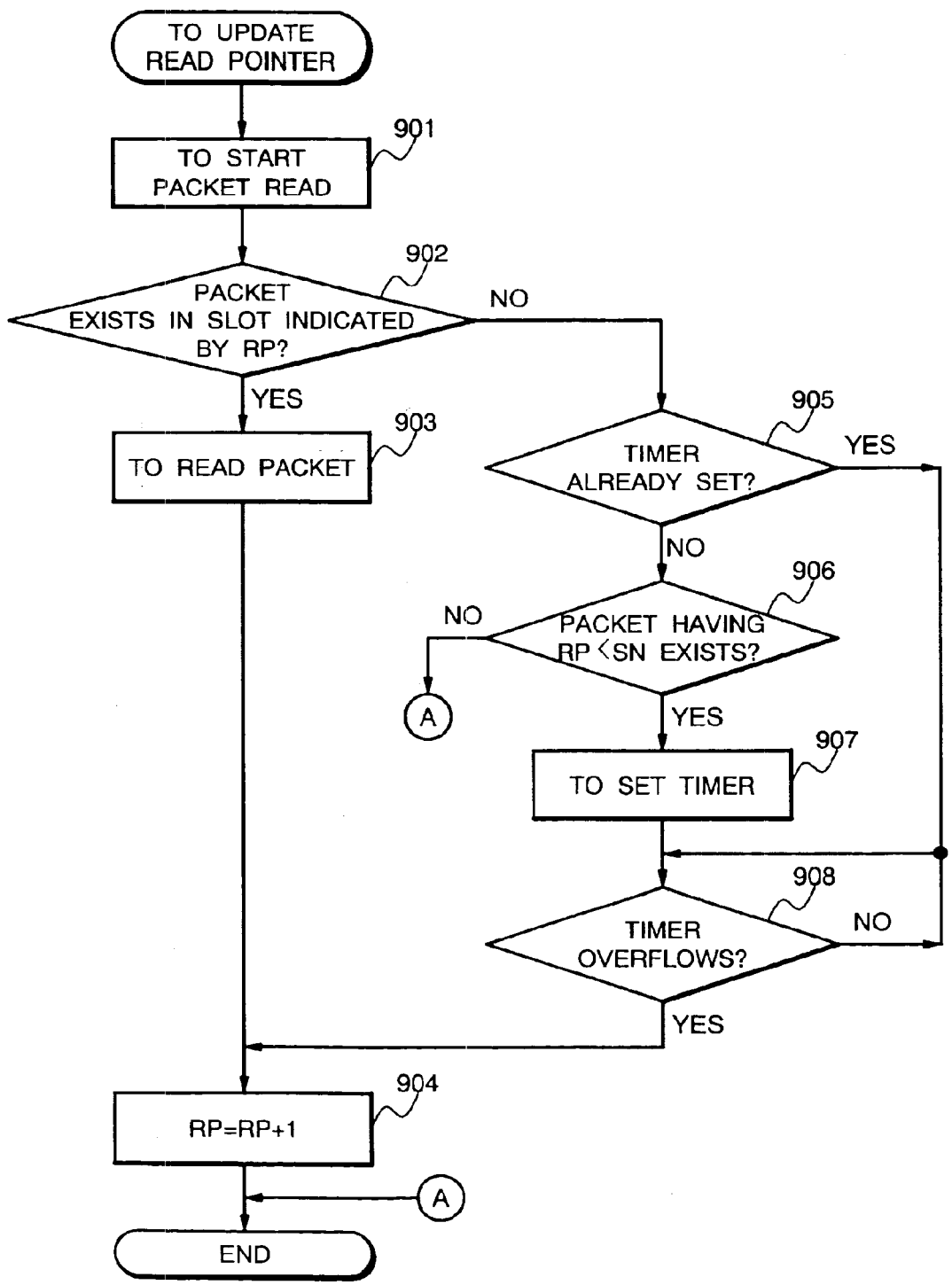
FIG. 9 is a flow chart showing operation of updating an initial value of a read pointer for use in reading a packet from a queue by the packet alignment unit in the present embodiment.

Next, with reference to FIG. 9, operation of updating the read pointer will be described. When the packet alignment unit 240 starts the operation of reading a packet from the queue 241 (Step 901), first, determine whether a packet exists or not in a slot indicated by the read pointer at that time (Step 902). When a packet exists, read the packet in question (Step 903). Then, by adding "1" to the value of the read pointer, update the read pointer (Step 904).

On the other hand, when no packet exists in the slot indicated by the read pointer, determine whether the above-described timer is already set or not (Step 905). When the timer is already set, wait for the timer in question to overflow and add "1" to the value of the read pointer to update the read pointer (Steps 908 and 904).

When the timer is not set, determine whether there exists a packet having a sequence number (SN) larger than the value of the read pointer in question in the queue 241 (Step 906). When such a packet exists, set the timer (Step 907), wait for the timer in question to overflow and add "1" to the value of the read pointer to update the read pointer (Steps 908 and 904).

When there exists no packet having a sequence number (SN) larger than the value of the read pointer, finish packet reading processing without updating the read pointer.

As described in the foregoing, when an initial value of the read pointer is determined based on a sequence number (SN) of a packet received first and a packet existing in a slot indicated by the read pointer in question is read, or when a predetermined time has passed without an arrival of a packet corresponding to the read pointer in question, the read pointer is updated. This processing prevents, when a predetermined packet is abandoned at a unit switch on the way, alignment of erroneous packets after waiting for the packet in question.

In the present embodiment, to a unit switch at the final stage, a number N of inputs are connected from a unit switch at the preceding stage. It is therefore desirable in view of throughput that with respect to each time slot (equivalent to a packet length), a number N of packets whose sequencing processing is already done are transmitted from the packet alignment unit 240 to the 2N×N switch unit 220. When a packet exists in the queue 241 as illustrated in FIG. 8, assuming that the number of the outputs are four, three packets are sent out from the queue 241 at the uppermost stage and one packet is sent out from the queue 241 at the second stage.

In general, when there exist a number N of outputs, a number N of packets can be sent in one time slot. Then, each queue 241 tries to update the read pointer so as to output as many packets as possible. Accordingly, at each queue 241, read pointer is updated a maximum of N times within one time slot.

As described in the foregoing, in a packet switch having unit switches connected in multi-stages, a unit switch at the first stage assigns a sequence number (SN) to an input packet and a unit switch at the final-stage outputs packets according to sequence numbers (SN) assigned to the received packets, which processing enables output of a packet which is to be output as soon as it arrives. It is accordingly unnecessary to cause a delay of a maximum time period required for a packet to pass from a unit switch at the first stage to a unit switch at the final stage though a packet already arrives at the unit switch at the final stage as is done in a case where packets are sequenced using a time stamp.

Moreover, since packet output is executed according to the order of sequence numbers (SN), packet alignment only needs determination whether a sequence number of an arriving packet is the same as that of a packet to be output next. It is therefore unnecessary to conduct complicated work, which is required in a case of sequencing packets using time stamps, of comparing time stamps assigned to all the packets arriving and detecting a packet having the oldest time stamp.

When sequence control of packets is conducted using sequence numbers (SN), attention should be given to a carry and circulation of sequence numbers (SN). More specifically, when the total number of sequence numbers (SN) prepared is extremely small, one circulation of the sequence numbers (SN) assigned to packets will result in having a plurality of packets assigned the same sequence number (SN) simultaneously existing in one unit switch, which might cause a situation where packet alignment is not conducted accurately.

For avoiding such a situation, there are methods of preventing more packets than the total number of sequence numbers (SN) from accumulating at a predetermined unit switch by setting the total number of sequence numbers (SN) to be large enough or returning a response message (ACK message) regarding a sequence number (SN) to a unit switch at the first stage. These methods will be individually described in the following.

First, description will be made of the prevention method by setting the total number of sequence numbers (SN) to be large enough. When a predetermined packet is being queued by a unit switch at the second stage, if other packet having the same sequence number (SN) circulated arrives at a unit switch at the final stage, alignment of packets will not be conducted accurately.

Here, assuming that a maximum value of a queuing delay at the unit switch at the second stage is M time slots (one time slot=one packet length) and the number of input and output ports is N, before a packet having the maximum delay passes through the unit switch at the second stage, as many as a number N×M of packets at the maximum having the same combination of a unit switch on the input side (first stage) and a unit switch on the output side (final stage) will be applied to the unit switch at the second stage. A value of a time stamp is updated as many as N×M times for a packet with the maximum delay. In such a case, logically, as long as the total number of sequence numbers (SN) is not less than N×N, packet alignment is always conducted accurately. In practice, 2×(N×M) is assumed to be a desired value as a total number of sequence numbers (SN) prepared in consideration of a processing delay in each component of a unit switch and the like.

Next, description will be made of the prevention method by using a response message (ACK message). In an ACK message, a position of a read pointer is described. Here, a position of a read pointer represents a value subsequent to a sequence number (SN) of a packet whose alignment processing is conducted last, that is, a value of a sequence number (SN) of a packet to be aligned next. The unit switch at the first stage updates sequence numbers (SN) up to modulo ($SN_{currentRP}+SN_{length}$) based on a value "$SN_{currentRP}$" described in an ACK message without receiving an ACK message, assigns the updated sequence numbers to packets and transmits the packets.

The following packets will be kept waiting or abandoned. Such control enables a number "$SN_{length}$" of packets at the maximum to be accumulated at the unit switch at the second stage. Here, "$SN_{length}$" may vary for each combination between a unit switch at the input side (first stage) and a unit switch at the output side (final stage). At this time, "$SN_{length}$" can be considered to be a virtual queue length in the unit switch at the second stage as a whole.

The packet switch of the present embodiment is allowed to accommodate high-speed lines by aligning packets using sequence numbers (SN) as described above. Then, adopting the following manner as a method of assigning sequence numbers (SN) enables accommodation of a line whose speed is higher than that of an input port of a unit switch.

Figure 10:
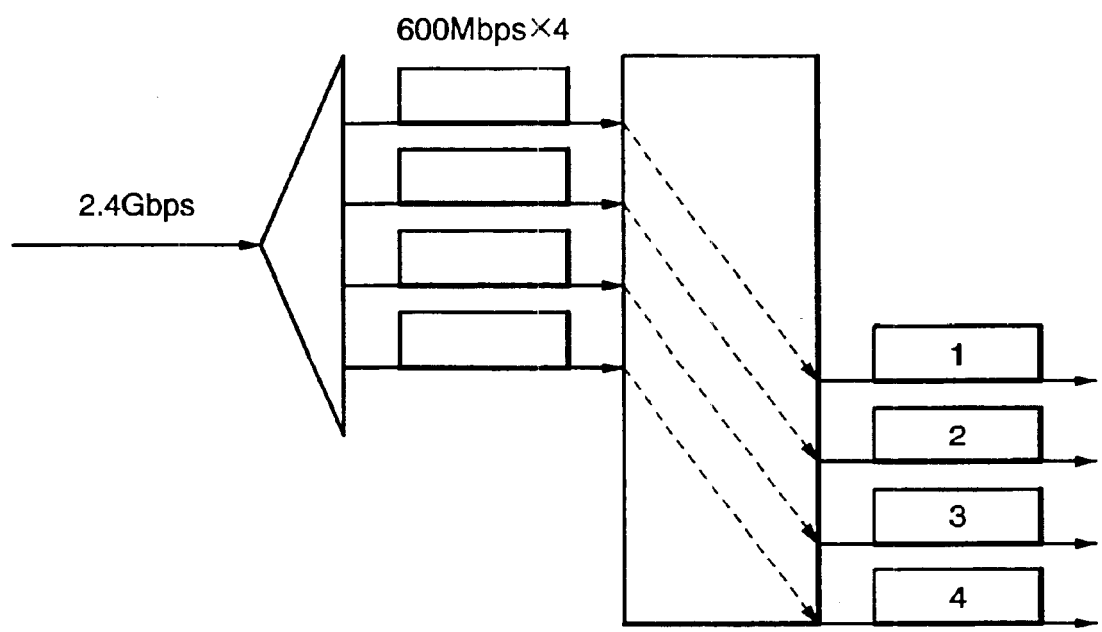
FIG. 10 is a schematic diagram for use in explaining a manner of accommodating a line whose speed is higher than that of an input port of a unit switch in the packet switch of the present embodiment.

Assume that a port speed of a unit switch is 600 Mbps. Accommodate a line of 2.4 Gbps in this unit switch. In this case, as illustrated in FIG. 10, divide the line of 2.4 Gbps into four 600 Mbps lines on a packet basis. Define rules such as that separation is always made sequentially starting at a low number of ports and sequence numbers (SN) are assigned starting with a low number. By assigning the sequence numbers (SN) conforming to the relevant rules, the order of separated packets can be also preserved. By restoring the packets in question according to the order of the sequence numbers (SN), the separated packets can be accurately restored.

In a manner as described above, a 2.4 Gbps line can be accommodated using a unit switch equivalent to 600 Mbps. Similarly, OC-192 (10 Gbps) can be accommodated through division into 600 Mbps each. In a case where a line of 2.4 Gbps is accommodated using a unit switch equivalent to 150 Mbps, the line in question is divided into 16 lines of 150 Mbps on a packet basis. In a case where the line of 2.4 Gbps is accommodated using a unit switch equivalent to 1.2 Gbps, the line in question is divided into two lines of 1.2 Gbps on a packet basis. Thus, it is possible to accommodate a line whose speed is higher than that of a port of a unit switch.

Figure 11:
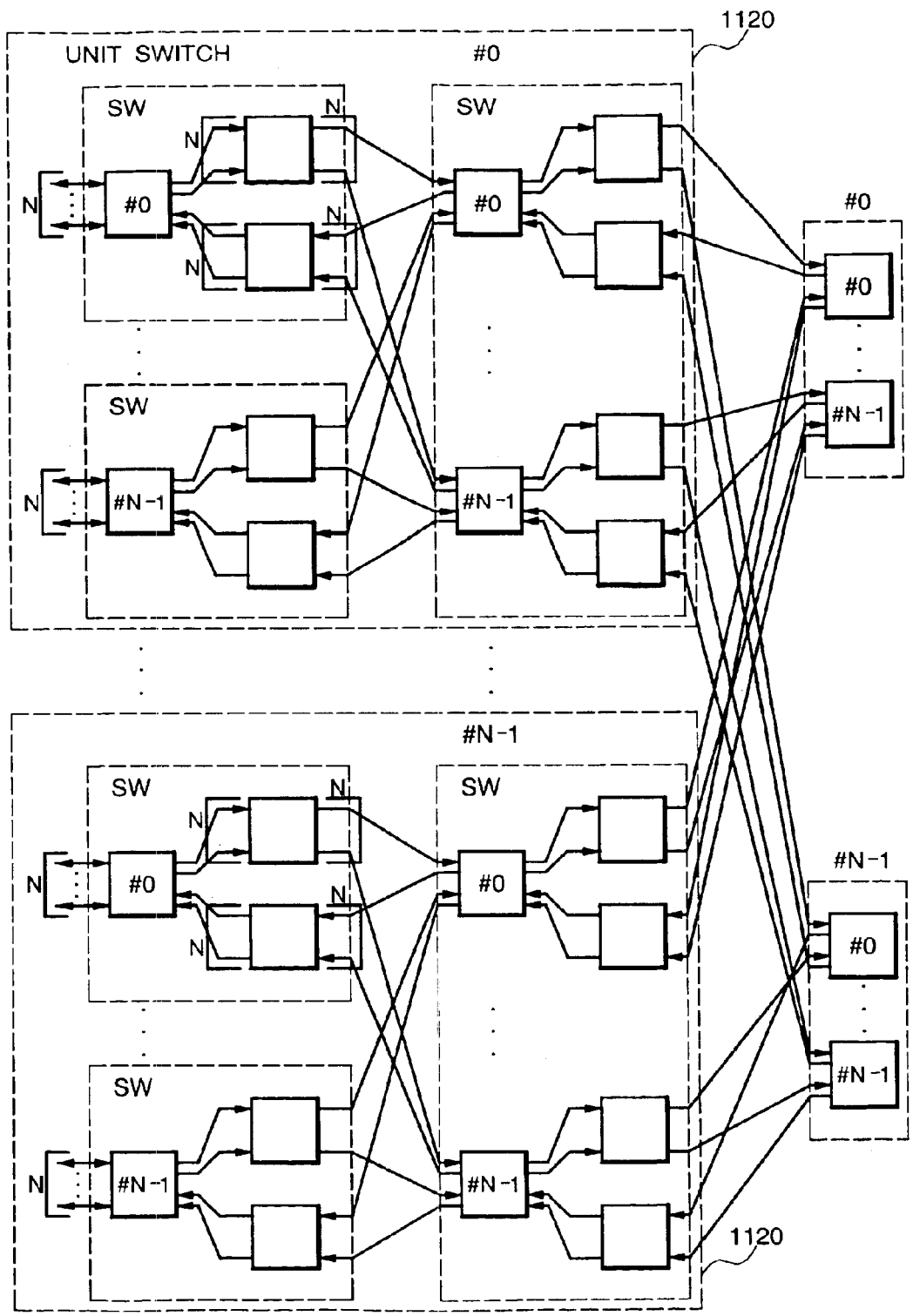
FIG. 11 is a diagram showing an example of a structure of a packet switch in which $N^2 \times N^2$ packet switches as a unit switch are connected in multi-stages to extend to $N^3 \times N^3$.
Figure 12:
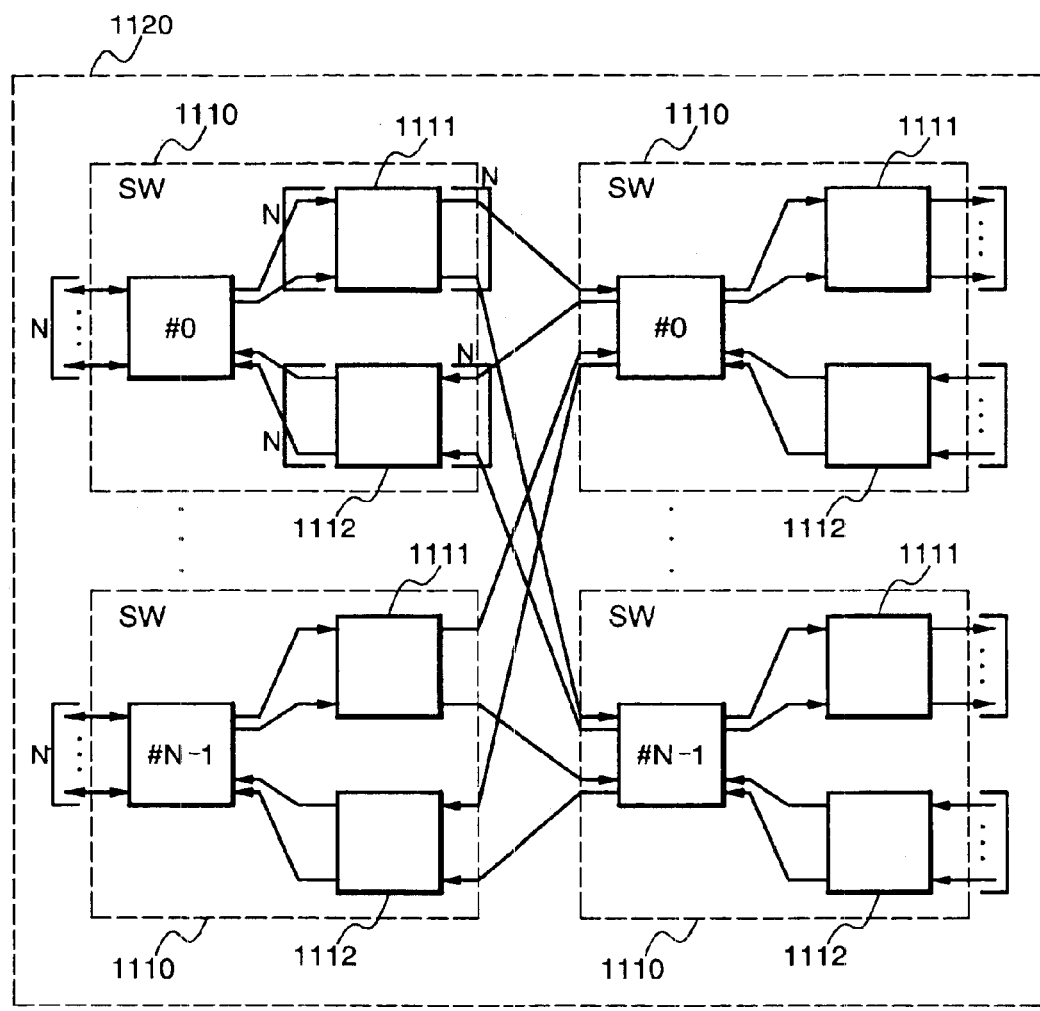
FIG. 12 is a block diagram showing a structure of a unit switch constituting the packet switch illustrated in FIG. 11.

FIG. 11 is a block diagram showing a structure of a packet switch according to another embodiment of the present invention. FIG. 12 is a block diagram showing a structure of a unit switch in the packet switch of the present embodiment. With reference to FIGS. 11 and 12, the present embodiment employs, as a unit switch, a $N^2 \times N^2$ packet switch 1120 constituted by connecting 2N×2N packet switches 1110 in two stages which have the same structure as that of the unit switch shown in FIG. 2. Then, a packet switch of $N^3 \times N^3$ is formed by further preparing a number N of the unit switches 1120 (#0~#N1) for extension.

In the present embodiment, in each packet switch 1110 constituting the unit switch 1120, a packet distribution unit 1111 and a packet alignment unit 1112 are prepared to conduct packet distribution and alignment. Since packet alignment operation using sequence numbers (SN) at the individual packet switch 1110 is the same as the packet alignment operation by the unit switch shown in FIG. 2 which has been described in the above first embodiment, no description will be made of the operation here.

Figure 13:
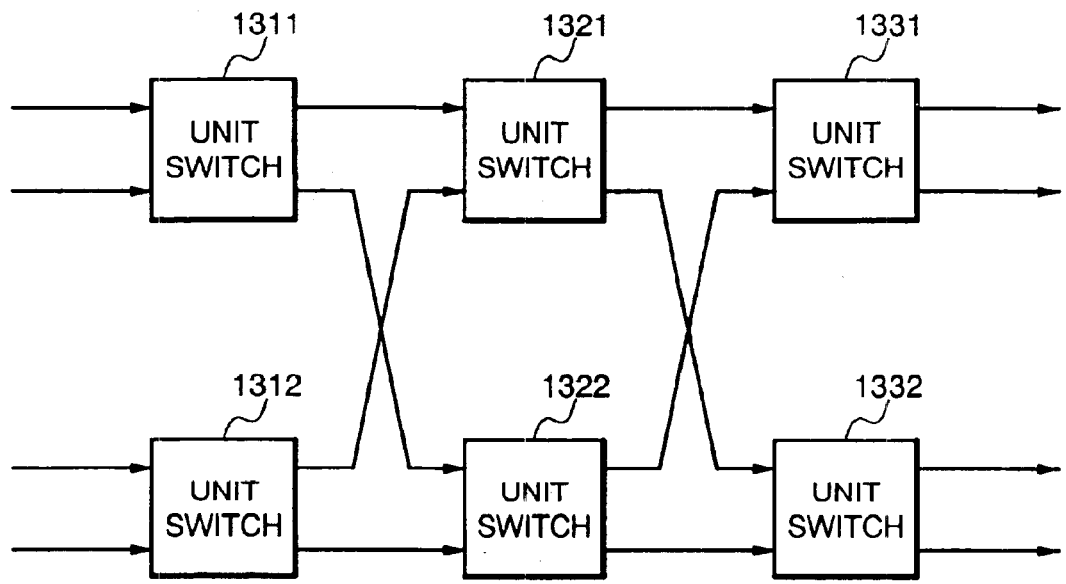
FIG. 13 is a block diagram showing a structure of a three-stage connection packet switch.
Figure 14:
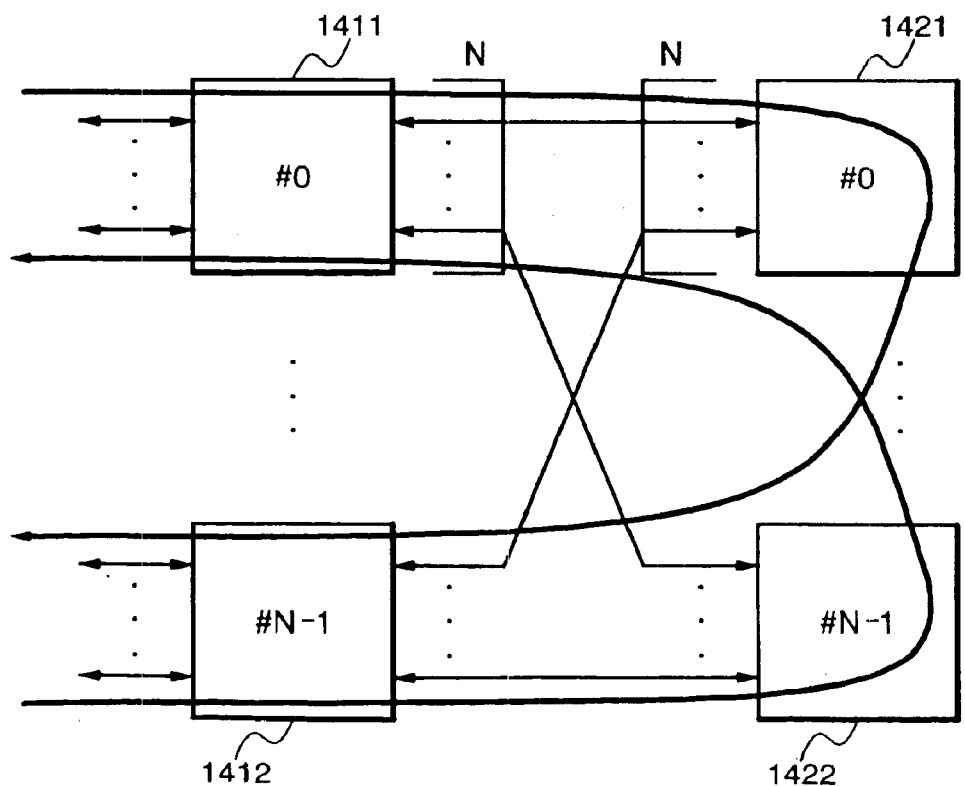
FIG. 14 is a diagram showing how a packet passes through a multi-stage connection packet switch.

Although the present invention has been described with respect to the preferred embodiments in the foregoing, the present invention is not always limited to the above-described embodiments. While in the above embodiments, the present invention is applied, for example, to a folded-type multi-stage switch, it is clearly understood that the present invention can be applied also to a multi-stage switch having the structure illustrated in FIG. 13.

As described in the foregoing, since according to the packet switch of the present invention, a sequence number is assigned to an input packet at a unit switch at a first stage and the packets are sequenced and output based on the sequence numbers assigned to the packets received at a unit switch at a final stage, it is unnecessary to delay a packet for a predetermined time period which is necessary in a case where packets are sequenced using a time stamp. This enables a time required for a packet to pass through a packet switch to be reduced, thereby improving quality of packet communication.

Further effect is enabling accommodation of a line whose speed is higher than that of an input port of a unit switch. Moreover, securing a port for extension at a unit switch in advance facilitates expansion and extension of unit switches.

Furthermore, being structured as a folded-type multi-stage switch, the packet switch of the present invention realizes return of control information from a unit switch at a succeeding state to a unit switch at a preceding stage by the same control as that of a packet communication path, which enables control information returning processing to be executed with ease.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A packet switch formed by connecting unit switches in multi-stages, wherein
    a unit switch at the first stage
        assigns a sequence number to each input packet according to a destination of the packet and to the order of distribution and sending of the packet and
        distributes and sends out each packet to a unit switch at a succeeding stage, and
    a unit switch at the final stage sequences and outputs packets received from a unit switch at a preceding stage in consecutive order of the sequence numbers assigned to the packets.

2. The packet switch as set forth in claim 1, wherein
    said unit switch at the first stage assigns, to an input packet, a sequence number set for each combination of a unit switch which has received input of the packet and a unit switch which finally outputs the packet, as well as assigning identification information about its own switch which is a unit switch having received input of said packet.

3. A packet switch formed by connecting unit switches in multi-stages, wherein
    a unit switch at the first stage assigns a sequence number to an input packet according to a destination of the packet and distributes and sends out the packet to a unit switch as a succeeding stage,
    a unit switch as the final stage sequences and outputs a packet received from a unit switch at a preceding stage according to the sequence number assigned to the packet, and
    the total number of sequence numbers to be assigned by said unit switch at the first stage to an input packet is set based on a maximum value of a queuing delay at a unit switch at the succeeding stage and the number of input and output ports of the unit switch in question at the succeeding stage.

4. A packet switch formed by connecting unit switches in multi-stages, wherein
    a unit switch at the first stage assigns a sequence number to an input packet according to a destination of the packet and distributes and sends out the packet to a unit switch at a succeeding stage,
    a unit switch as the final stage sequences and outputs a packet received from a unit switch at a preceding stage according to the sequence number assigned to the packet,
    said unit switch at the first stage assigns, to an input packet, a sequence number set for each combination of a unit switch which has received input of the packet and a unit switch which finally outputs the packet, as well as assigning identification information about its own switch which is a unit switch having received input of said packet, and said unit switch at the final stage
includes queues provided for the respective unit switches at the first stage which receive input of packets and slotted on a packet basis, based on said identification information and said sequence number assigned to a packet arriving from a unit switch at the preceding stage, writes the packet in question into a corresponding slot of corresponding one of said queues, and sequentially reads and outputs said packets written in said queues according to the order of said sequence numbers.

5. The packet switch as set forth in claim 4, wherein said unit switch at the final stage determines an initial value of a read pointer for said queue based on a sequence number of a packet received first.

6. The packet switch as set forth in claim 4, wherein when a packet is read from a slot indicated by a read pointer in said queue or when no packet arrives at the slot indicated by the read pointer in said queue for a predetermined time period, said unit switch at the final stage updates the read pointer in question.

7. The packet switch as set forth in claim 4, wherein said unit switch at the final stage determines an initial value of a read pointer for said queue based on a sequence number of a packet received first, and when a packet is read from a slot indicated by a read pointer in said queue or when no packet arrives at the slot indicated by the read pointer in said queue for a predetermined time period, updates the read pointer in question.

8. A packet switch formed by connecting unit switches in multi-stages, wherein a unit switch at the first stage assigns a sequence number to an input packet according to a destination of the packet and distributes and sends out the packet to a unit switch as a succeeding stage, a unit switch as the final stage sequences and outputs a packet received from a unit switch at a preceding stage according to the sequence number assigned to the packet, and said unit switch comprises:
a 2N×2 switch unit having a number 2N of input ports and a number N of output ports,
a packet distribution unit for assigning, to an input packet, a sequence number according to a destination of the packet and distributing and sending out the packet to a unit switch at a succeeding stage,
a packet alignment unit for sequencing, according to a sequence number assigned to a packet received from a unit switch at a preceding stage, a packet and transferring the sequenced packets to said 2N×N switch unit, and
a filter for distributing input packets into packets to be returned within its own switch and packets to be sent out to a unit switch at a succeeding stage and transferring said packets to be returned to said 2N×N switch unit and transferring said packets to be sent to a switch at a succeeding stage to said packet distribution unit.

9. The packet switch as set forth in claim 8, wherein said packet distribution unit at said unit switch at the first stage assigns, to an input packet, a sequence number set for each combination of a unit switch which has received input of the packet and a unit switch which finally outputs the packet, as well as assigning identification information about its own switch which is a unit switch having received input of said packet.

10. The packet switch as set forth in claim 8, wherein the total number of sequence numbers to be assigned by said packet distribution unit in said unit switch at the first stage to an input packet is set based on a maximum value of a queuing delay at a unit switch at the succeeding stage and the number of input and output ports of the unit switch in question at the succeeding stage.

11. The packet switch as set forth in claim 9, wherein said unit switch at the final stage includes queues provided for the respective unit switches at the first stage which receive input of packets and slotted on a packet basis, based on said identification information and said sequence number assigned to a packet arriving from a unit switch at a preceding stage, said packet alignment unit writes the packet in question into a corresponding slot of corresponding one of said queues, and said 2N×N switch unit sequentially reads and outputs said packets written in said queues according to the order of said sequence numbers.

12. The packet switch as set forth in claim 11, wherein said unit switch at the final stage determines an initial value of a read pointer for said queue based on a sequence number of a packet received first.

13. The packet switch as set forth in claim 11, wherein when a packet is read from a slot indicated by a read pointer in said queue or when no packet arrives at the slot indicated by the read pointer in said queue for a predetermined time period, said unit switch at the final stage updates the read pointer in question.

14. The packet switch as set forth in claim 11, wherein said unit switch at the final stage determines an initial value of a read pointer for said queue based on a sequence number of a packet received first, and when a packet is read from a slot indicated by a read pointer in said queue or when no packet arrives at the slot indicated by the read pointer in said queue for a predetermined time period, updates the read pointer in question.

15. A packet switch formed by connecting unit switches in multi-stages, wherein:
a unit switch at the first stage
assigns a sequence number set to input packets according to the destination of the packets
assigns individual sequence numbers to packets within each set, and
distributes and sends out packets to unit switches at a succeeding stage, and a unit switch at the final stage sequences and outputs packets, within each set received from a preceding stage, in consecutive order of the sequence numbers assigned to the packets.

* * * * *